(12) United States Patent
Chen et al.

(10) Patent No.: US 9,701,799 B2
(45) Date of Patent: Jul. 11, 2017

(54) TRANSPARENT GAS BARRIER COMPOSITE FILM AND ITS PREPARATION METHOD

(71) Applicant: CHUNG YUAN CHRISTIAN UNIVERSITY, Tao-Yuan (TW)

(72) Inventors: Jung-Tsai Chen, Taoyuan County (TW); Chien-Chieh Hu, Taoyuan County (TW); Kueir-Rarn Lee, Taoyuan County (TW); Juin-Yih Lai, Taoyuan County (TW); Ywu-Jang Fu, Taoyuan County (TW); Quan-Fu An, Taoyuan County (TW); Shen-Chuan Lo, Taoyuan County (TW); Yue-Zhe Zhong, Taoyuan County (TW)

(73) Assignee: CHUNG YUAN CHRISTIAN UNIVERSITY, Tao-Yuan (TW)

( * ) Notice: Subject to any disclaimer, the term of this patent is extended or adjusted under 35 U.S.C. 154(b) by 115 days.

(21) Appl. No.: 14/508,307

(22) Filed: Oct. 7, 2014

(65) Prior Publication Data
US 2016/0046773 A1    Feb. 18, 2016

(30) Foreign Application Priority Data
Aug. 18, 2014  (TW) .............................. 103128355 A

(51) Int. Cl.
*C08K 3/20* (2006.01)
*C08L 29/04* (2006.01)
(Continued)

(52) U.S. Cl.
CPC .................. *C08J 5/18* (2013.01); *B05D 7/04* (2013.01); *C08K 3/0016* (2013.01); *C08K 3/20* (2013.01);
(Continued)

(58) Field of Classification Search
CPC ......................................................... C08L 29/04
See application file for complete search history.

(56) References Cited

U.S. PATENT DOCUMENTS 5,547,764 A * 8/1996 Blais .................... C09D 129/04
427/407.1
5,574,096 A * 11/1996 Tanaka .................... B32B 27/08
525/221

FOREIGN PATENT DOCUMENTS

JP        2007058176 A  *  3/2007
KR   WO 2008111702 A1 *  9/2008 ................ C08J 5/18
KR        20120024263 A  *  3/2012

OTHER PUBLICATIONS

Machine translated English language equivalent of KR 20120024263 (Mar. 2012, 12 pages).*

(Continued)

*Primary Examiner* — Brieann R Fink
(74) *Attorney, Agent, or Firm* — WPAT, PC

(57) ABSTRACT

The invention provides a transparent gas barrier composite film and its preparation method. The transparent gas barrier composite film is formed by having polyvinyl alcohol, graphene oxide and a crosslinking agent undergo blending, crosslinking, film casting and isothermal crystallization processes where a weight ratio of graphene oxide to polyvinyl alcohol is 0.1 wt %, graphene oxide induces crystallization of polyvinyl alcohol to form a hybrid structure compose of polyvinyl alcohol crystals, graphene oxide and the crosslinking agent, crystallinity of polyvinyl alcohol is more than 30%, transmittance of the composite film is more than 85%, and the oxygen transmission rate of the composite film is less than 0.005 cc/m²/day.

14 Claims, 14 Drawing Sheets

(51) Int. Cl.
*C08J 5/18* (2006.01)
*C08K 3/00* (2006.01)
*C08K 5/00* (2006.01)
*B05D 7/04* (2006.01)

(52) U.S. Cl.
CPC ............ *C08K 5/0025* (2013.01); *C08L 29/04* (2013.01); *C08J 2329/04* (2013.01); *C08L 2201/14* (2013.01)

(56) References Cited

OTHER PUBLICATIONS

Machine translated English language translation of JP 2007-058176 (Mar. 2007, 13 pages).*
Chen et al. "Enhancing polymer/graphene oxide gas barrier film properties by introducing new crystals", Apr. 13, 2014, Elsevier Ltd.

* cited by examiner (a)

(b)

(c)

TRANSPARENT GAS BARRIER COMPOSITE FILM AND ITS PREPARATION METHOD

BACKGROUND OF THE INVENTION

1. Field of the Invention

The present invention is generally related to a gas barrier composite film and its preparation method, and more particularly to a transparent gas barrier composite film and its preparation method using polyvinyl alcohol and graphene oxide.

2. Description of the Prior Art

A transparent film with high gas barrier can be not only used as packaging materials and but also gradually extensively applied as substrates or sealing films of electronic devices accompanying with development of flexible electronic products. Film deposition or atomic layer deposition to deposit atomic or molecular scaled dense films may obtain a film have high gas barrier, high transparency, a high coverage rate and high uniformity but these methods not only require expensive instrument but also needs to repeatedly deposit multiple barrier layers in order to achieve high barrier effect. Thus, it has time consuming and high cost problems. Furthermore, generally these methods use, for example, inorganic films such as $SiO_2$ or organic/inorganic alternately deposited multi-layered films as a gas barrier film but has fracture and crack problems due to bad flexibility when applied in flexible electronic devices to further result in shortening device lifetime.

Solution blending is currently one of extensively used methods to prepare a composite film because it is simple, fast and easy to mass production. Solution blending can be used to prepare a super high gas barrier film. Solution blending by adding graphene or its derivatives in a polymer to effectively increase gas barrier property of a resulting composite is reported. Although the gas barrier property of a composite can be improved after blending with graphene, the degree of improvement on the gas barrier property is very limited and the gas barrier property of the composite is still far away from the requirement for flexible electronic products having a difference by a few orders of magnitude.

Sadasivuni et al. reported in 2013 a poly(isobutylene-co-isoprene)/graphene composite film having an oxygen transmission rate of 28.4 $cc/m^2/day$ (K. Sadasivuni, A. Saiter, N. Gautier, S. Thomas, Y. Grohens, Effect of molecular interactions on the performance of poly(isobutylene-co-isoprene)/graphene and clay nanocomposites, Colloid Polym Sci, 291 (2013) 1729~1740); and Jin, et al. reported a Nylon 11/graphene composite film having an oxygen transmission rate of 14.9 $cc/m^2/day$ (J. Jin, R. Rafiq, Y. Q. Gill, M. Song, Preparation and characterization of high performance of graphene/nylon nanocomposites, European Polymer Journal, 49 (2013) 2617~2626). The difference between the reported composite films and the requirement (OTR< $10^{-1}$~$10^{-6}$ $cc/m^2/day$) for flexible electronic products is about 2~8 orders of magnitude.

Generally, to achieve an organic/inorganic composite film having high gas barrier should consider the following factors: (1) inorganic substance should be uniformly dispersed in polymer matrix; (2) inorganic substance should have strong interaction with polymers; (3) inorganic substance has a large aspect ratio; and (4) inorganic substance can be piled up or aligned more densely as the concentration of the inorganic substance in polymer matrix is increased, disregard of aggregation of inorganic particles, so as to increase the degree of gas blockage.

Furthermore, a method combining solution blending and isothermal recrystallization to prepare a composite file being high gas barrier and high transparent is easier than to other film forming methods and can enhance the gas barrier performance but the long post processing for the composite film is required. Thus, the long post processing should be shortened for industrial continuous production processes and how to achieve the crystalline-like barrier effect is an important task for the industries.

On the other hand, the cross-linking reaction usually is used to suppress mobility or flexibility of polymer chains to reduce free volume so as to enhance the gas barrier performance. When a composite film is prepared by solution blending, the post cross-linking reaction usually is performed in the prior art, if the film forming property during coating processing from a polymer solution is considered. The post cross-linking reaction can be performed by a long period time of thermal processing or dipping in a chemical cross-linking agent but the long post cross-linking reaction cannot be simplified and also requires a large-scaled thermal processing device. It requires the high production cost and large and also has an uneven heating problem, particular for a large film.

SUMMARY OF THE INVENTION

In light of the above background, in order to fulfill the requirements of industries, one object of the present invention is to provide a transparent gas barrier composite film and its preparation method to use a simple and low cost method to obtain a high transparent and high gas barrier suitable for flexible electronic devices. Particularly, the present invention uses a pre-crosslinking method to prepare a composite film. The pre-crosslinking method is to cross-link the PVA/GO blended solution containing a crosslinking agent and to coat the solution for film forming so that the long post processing can be spared to reduce energy consumption and the uniformity of a large-area composite film can be increased. Besides, the viscosity of the polymer solution after the pre-crosslinking should not be high to affect the coating process for film forming. Therefore, the selection of the crosslinking agent and the adjustment of the degree of cross-linkage of the polymer solution after the pre-crosslinking are keys of the present invention.

One object of the present invention is to provide a method for preparing a transparent gas barrier composite film by combining solution blending, isothermal recrystallization and pre-crosslinking methods to prepare a PVA/GO (polyvinyl alcohol/graphene oxide) composite film. The pre cross-linking method is to have a mixture solution containing PVA/GO blended with a crosslinking agent cross-linked before forming into a film by coating so that long post processing can be avoided, a large-area composite film can be form with higher uniformity and energy consumption can be reduced.

Moreover, one object of the present invention is to provide a transparent gas barrier composite film by utilizing graphene oxide with a high aspect ratio (a ratio of length to thickness) and polyvinyl alcohol as a polymer matrix where oxygen containing groups of graphene oxide form hydrogen bonds with hydroxyl groups of polyvinyl alcohol to generate strong interaction and besides the high aspect ratio of graphene oxide prolongs the path of gas permeation. In addition, the addition quantity of graphene oxide is kept at a low level to maintain high transmittance of the composite film and the crosslinking agent is used to densify the polymer structure. By increasing interfacial interaction between PVA and GO, linking GO nano flakes with polymers and increasing the effective aspect ratio, the gas barrier property can be further enhanced.

Accordingly, in one embodiment, the present invention discloses a method for preparing a transparent gas barrier composite film, comprising: providing a polyvinyl alcohol containing aqueous solution; providing a graphene oxide dispersed aqueous solution; performing a blending procedure, to blend the polyvinyl alcohol containing aqueous solution with the graphene oxide dispersed aqueous solution to obtain a casting solution wherein a weight ratio of graphene oxide in the graphene oxide dispersed aqueous solution to polyvinyl alcohol in the polyvinyl alcohol containing aqueous solution is less than 0.1 wt %; performing a cross-linking procedure, to add a cross-linking agent into the casting solution to have in-situ cross-linking reaction; and performing a film-casting procedure, to coat the casting solution after the in-situ cross-linking reaction on a substrate to form a coating and dry the coating so as to obtain a composite film.

In another embodiment, the present invention discloses a transparent gas barrier composite film, being formed by having polyvinyl alcohol, graphene oxide and a crosslinking agent undergo blending, crosslinking, film casting and isothermal crystallization procedures wherein a weight ratio of graphene oxide to polyvinyl alcohol is 0.1 wt %, graphene oxide induces crystallization of polyvinyl alcohol to form a hybrid structure compose of polyvinyl alcohol crystals, graphene oxide and the crosslinking agent, crystallinity of polyvinyl alcohol is more than 30%, transmittance of the composite film is more than 85%, an oxygen transmission rate of the composite film is less than 0.005 cc/m²/day.

According to the transparent gas barrier composite film and the preparation method of the present invention, the composite film has high transmittance, an elongated path for gas permeation, a densified polymer structure, increased interaction between PVA and GO, linkages between GO nano flakes and polymers, and an increased aspect ratio. Therefore, a simple and low cost method is provided to obtain a high transparent and high gas barrier suitable for flexible electronic devices.

BRIEF DESCRIPTION OF THE DRAWINGS

FIGS. 6 (d)~(f) show FE-SEM cross-sectional images of the composite film according to one embodiment of the present invention where (d) GO=0.1 wt %; (e) GO=0.5 wt %; and (f) GO=1.0 wt %;

DESCRIPTION OF THE PREFERRED EMBODIMENTS

Figure 1:
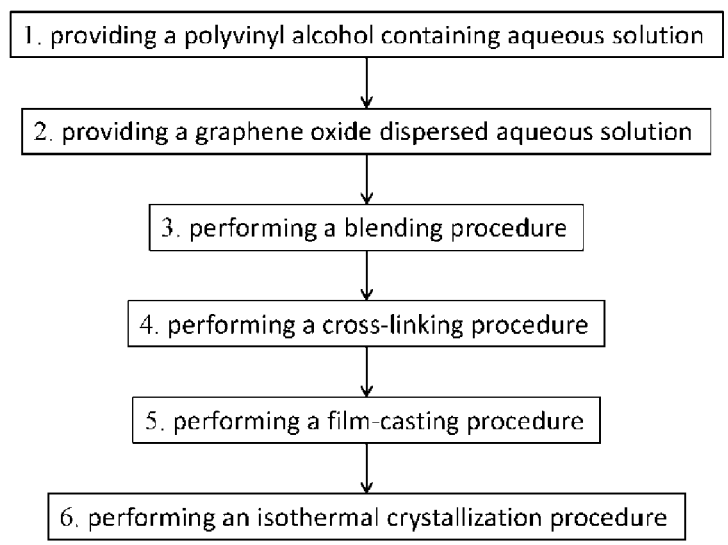
FIG. 1 shows a flow chart of a method for preparing a transparent gas barrier composite film according to one embodiment of the present invention.

What is probed into the invention is a transparent gas barrier composite film. Detail descriptions of the compositions, structures, elements and steps will be provided in the following in order to make the invention thoroughly understood. Obviously, the application of the invention is not confined to specific details familiar to those who are skilled in the art. On the other hand, the common compositions, structures, elements and steps that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

According to a first embodiment of the present invention, a method for preparing a transparent gas barrier composite film is disclosed. The method comprises the following steps: providing a polyvinyl alcohol containing aqueous solution; providing a graphene oxide dispersed aqueous solution; performing a blending procedure, to blend the polyvinyl alcohol containing aqueous solution with the graphene oxide dispersed aqueous solution to obtain a casting solution wherein a weight ratio of graphene oxide in the graphene oxide dispersed aqueous solution to polyvinyl alcohol in the polyvinyl alcohol containing aqueous solution is less than 0.1 wt %; performing a cross-linking procedure, to add a cross-linking agent into the casting solution to have in-situ cross-linking reaction; and performing a film-casting procedure, to coat the casting solution after the in-situ cross-linking reaction on a substrate to form a coating and dry the coating so as to obtain a composite film.

The method for preparing a transparent gas barrier composite film further comprises: performing an isothermal crystallization procedure after the film-casting procedure, to maintain a specific period of time at a specific temperature to have crystals of polyvinyl alcohol grow and to have graphene oxide induce the crystals of polyvinyl alcohol to grow so as to incorporate with graphene oxide and the cross-linking agent to form a hybrid network structure of the crystals of polyvinyl alcohol, graphene oxide and the cross-linking agent.

In one embodiment, in the cross-linking procedure, the cross-linking agent is glutaraldehyde or sodium tetraborate and cross-linking time for perform the cross-linking procedure is 2~6 hours.

In one embodiment, the cross-linking agent is glutaraldehyde and the cross-linking agent in the casting solution (being 100 wt %) is 0.2~0.85 wt %. In another embodiment, the cross-linking agent is glutaraldehyde and the cross-linking agent in the casting solution (being 100 wt %) is 0.2~0.85 wt %.

In one embodiment, the cross-linking agent is sodium tetraborate and the cross-linking agent in the casting solution (being 100 wt %) is 0.1~1.0 wt %.

In one embodiment, the specific temperature is within 80~120° C. and the specific period of time is 0.5~6 hours.

In one embodiment, the specific temperature is within 90~100° C. and the specific period of time is 1~6 hours.

In one embodiment, the specific temperature is within 90~100° C. and the specific period of time is 1~6 hours.

In one embodiment, in the blending procedure, a weight ratio of graphene oxide to polyvinyl alcohol is 0.1 wt % and the obtained composite film has light transmittance larger than 85%.

In one embodiment, the substrate is polyethylene terephthalate and the coating after dried has a thickness of 10 μm.

In one embodiment, polyvinyl alcohol in the polyvinyl alcohol containing aqueous solution has concentration of 5~10 wt %.

Furthermore, according to a second embodiment of the present invention, a transparent gas barrier composite film, being formed by having polyvinyl alcohol, graphene oxide and a crosslinking agent undergo blending, crosslinking, film casting and isothermal crystallization procedures wherein a weight ratio of graphene oxide to polyvinyl alcohol is 0.1 wt %, graphene oxide induces crystallization of polyvinyl alcohol to form a hybrid structure compose of polyvinyl alcohol crystals, graphene oxide and the cross-linking agent, crystallinity of polyvinyl alcohol is more than 30%, transmittance of the composite film is more than 85%, an oxygen transmission rate of the composite film is less than 0.005 cc/m²/day.

In one embodiment, the cross-linking agent is sodium tetraborate; sodium tetraborate forms B—O—C bonds together with polyvinyl alcohol and graphene oxide; and a cross-linking rate defined as a ratio of numbers of B—O—C bonds to numbers of —CH₂ bonds is 1.05~1.15. In another embodiment, the cross-linking agent is glutaraldehyde; glutaraldehyde forms C—O—C bonds together with polyvinyl alcohol and graphene oxide; and a cross-linking rate defined as a ratio of numbers of C—O—C bonds to numbers of —CH₂ bonds is 1.02~1.05. The ratio of numbers of B—O—C bonds to numbers of —CH₂ bonds is determined by the integrated area of the absorption peak of the B—O—C bonds divided by the he integrated area of the absorption peak of the —CH₂ bonds from FTIR spectrum of the composite film. The ratio of numbers of C—O—C bonds to numbers of —CH₂ bonds is determined by the integrated area of the absorption peak of the C—O—C bonds divided by the he integrated area of the absorption peak of the —CH₂ bonds from FTIR spectrum of the composite film.

In one embodiment, the transparent gas barrier composite film has an oxygen transmission rate less than 0.005 cc/m²/day. The OTR (oxygen transmission rate) is measured using MOCON (Minneapolis, Minn., Oxtran 2/21 ML).

The following examples are used to further illustrate the present invention but the present invention is not limited to these examples.

Please refer to FIG. 1 showing a flow chart of a method for preparing a transparent gas barrier composite film according to one embodiment of the present invention.

1. Polyethylenealcohol (PVA; Sigma Aldrich; Mw: 146,000-186,000) was dissolved in deionized water at 90° C. to obtain a 10 wt % PVA solution.

2. Graphene oxide (GO) with a proper amount was dispersed in deionized water by ultrasonic oscillation to form a GO suspension. The content of GO is about 0.1~1.0 wt % of PVA.

3. The 10 wt % PVA solution was blended with the GO suspension with various quantities and the mixture was stirred until becoming uniform to obtain 5 wt % PVA/GO casting solution with different concentration of GO. The casting solution sat for overnight to remove bubbles therein.

4. In the 5 wt % PVA/GO-0.1 wt % casting solution, the crosslinking agent was added with the amount based on the weight of PVA. After stirred until becoming uniform, the casting solution was heated to 90° C. and stirred to perform the in-situ crosslinking reaction. After the reaction finished, the reaction solution sat until its temperature decreased and the bubbles in the solution were removed. The data were taken for changing the concentration of the crosslinking agent at the fixed reaction time of 1 hour and for changing the crosslinking time 0~6 hours at the fixed concentration of the crosslinking agent, 1 wt %. The effects of the concentration of the crosslinking agent and the crosslinking time on the barrier property of the composite film were studied.

5. The casting solution after the crosslinking reaction was coated on a PET flexible film or a glass plate to prepare a PVA/GO/PET composite film. The coated film was placed in an oven at 90° C. to dry for 1 hour. After the solvent evaporated, the film was placed in vacuum at room temperature for 24 hrs to remove the residual solvent. The PVA/GO layer on the composite film is about 10 μm.

The PVA/GO composite film was placed in a circulation oven to perform isothermal crystallization processing at a fixed temperature for a fixed period of time. The processing temperature and time were set at 80~140° C. and 0~6 hours, respectively. The composite film was taken out from the oven after processing and then placed in a refrigerator at 5° C. to quench so that the polymer chains at crystalline and non-crystalline regions become stiff to have its structure fixed. Finally, the composite film was vacuum-dried for 24 hrs.

At first, the oxygen barrier property and transparency of the composite film versus the GO addition quantity will be studied. When the GO addition quantity is less than 0.1 wt %, the transmittance at 550 nm is also not affected and can be more than 85%.

PVA as the polymer matrix blended with GO is because (1) PVA is a water soluble polymer and can be well blended with GO which is reported that GO can be well dispersed molecularly in the PVA matrix; (2) OH groups on the side chain of PVA can form hydrogen bonds with oxygen containing groups of GO to have strong interaction force between PVA and GO; and (3) GO is an inorganic layer-typed material having a large aspect ratio. At a low addition quantity of GO, the oxygen barrier property of PVA can be significantly enhanced and also the high transmittance of the film can be maintained.

Figure 2:
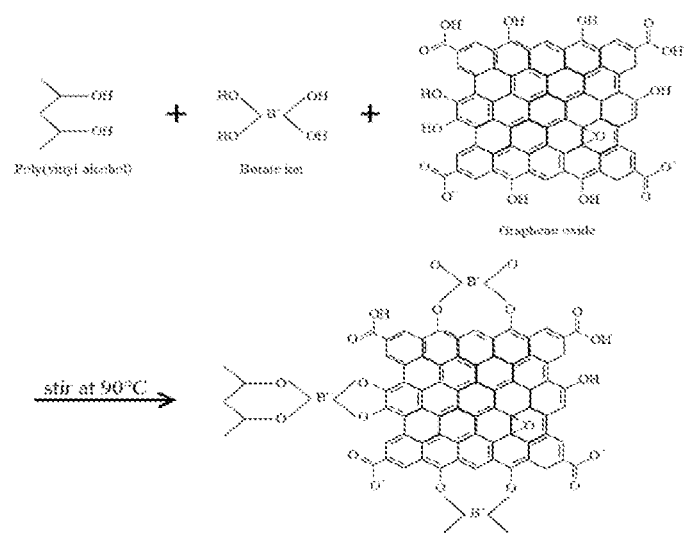
FIG. 2 shows a schematic diagram illustrating the cross-linking reaction of sodium tetraborate, PVA and GO according to one embodiment of the present invention.
Figure 3:
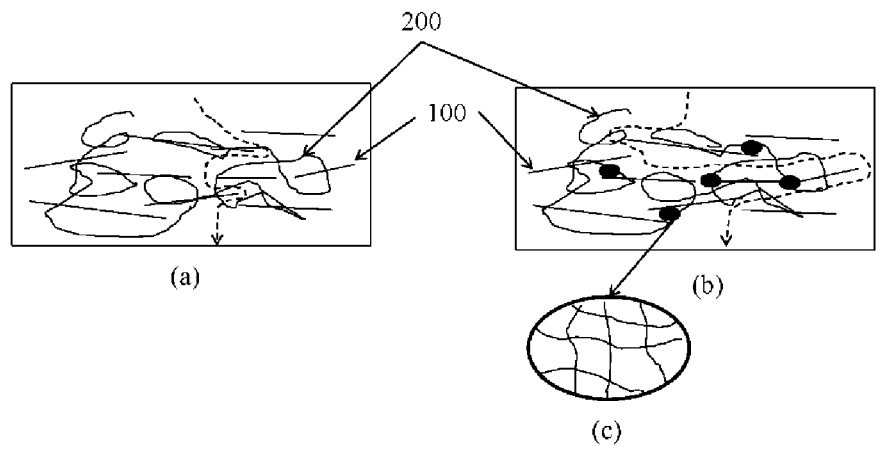
FIG. 3 shows a schematic diagram illustrating the relationship between the gas permeation path and crosslinking level of the composite film according to one embodiment of the present invention.

FIG. 2 shows a schematic diagram illustrating the crosslinking reaction of sodium tetraborate, PVA and GO according to one embodiment of the present invention. FIG. 3 shows a schematic diagram illustrating the relationship between the gas permeation path and crosslinking level of the composite film according to one embodiment of the present invention where (a) shows an uncrosslinked PVA/GO composite film; (b) shows a PVA/GO composite film after the in-situ crosslinking reaction; and (c) shows GO induced PVA crystallization to form a hybrid structure of PVA crystal, GO and the crosslinking agent. At first, PVA is blended with a small amount of GO and a nano composite film can be formed because GO can be well dispersed in the PVA matrix. The well dispersed GO can block the passage of oxygen because the penetrating route of oxygen along the depth of the composite film increases and thus the oxygen transmission rate at the time decreases. However, there is still some space having amorphous PVA that allows oxygen permeating between GO. The barrier property is not perfect. In order to fill up the space, the PVA/GO composite film is further processed by isothermal recrystallization. The newly formed or grown PVA crystals exist between the nano flakes of GO to fill up gaps or empty space to form a PVA crystal/GO hybrid barrier layer.

Therefore, according to the present invention, not only the gas permeation path can be prolonged but also the high transmittance of the PVA film can be maintained. Furthermore, since the crosslinking agent is used to perform crosslinking reaction before film forming, the oxygen transmission rate of the composite film increases as the concentration of the crosslinking agent increases. But, the oxygen transmission rate has a trend of at first decreasing and then increasing which may be due to the effect of the degree of crosslinking and the effect of crystallinity. As the concentration of the crosslinking agent is higher, the crystallinity of PVA is lower because crosslinking or branching weakens hydrogen bonding between PVA and interferes PVA piling-up. On the other hand, crosslinking makes the structure more compact to enhance the barrier property and branching or crystallinity reduces the barrier property. Furthermore, the crosslinking agent is preferably sodium tetraborate because sodium tetraborate can effectively reduce the oxygen transmission rate compared to glutaraldehyde. It may be because sodium tetraborate has four OH groups to react with PVA/GP and have a quicker reaction rate and sodium tetraborate has the smaller steric effect as a crosslinking center which can form a dense structure and have a smaller effect on the crystallinity of PVA.

Figure 4:
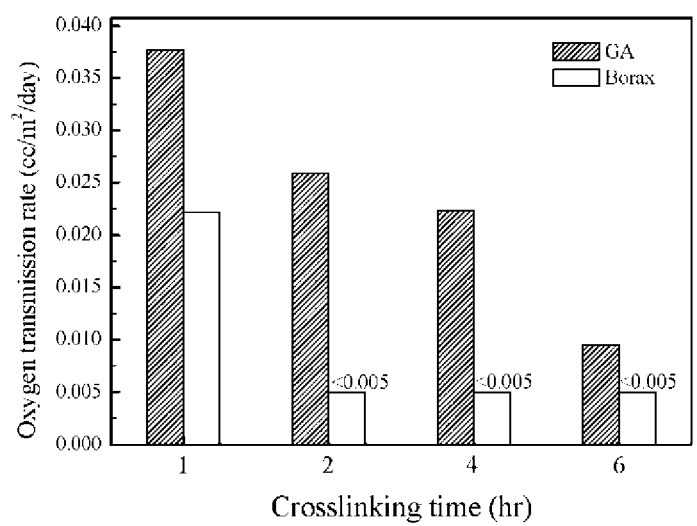
FIG. 4 shows a schematic diagram illustrating the relationship between the gas permeation path and crosslinking time of the composite film according to one embodiment of the present invention where GA represents glutaraldehyde and Borax represents sodium tetraborate as the crosslinking agent.

FIG. 4 shows a schematic diagram illustrating the relationship between the gas permeation path and crosslinking time of the composite film according to one embodiment of the present invention where GA represents glutaraldehyde and Borax represents sodium tetraborate as the crosslinking agent. The crosslinking time is 1~6 hrs for the crosslinking reaction and the oxygen transmission rate of the composite film is less than 0.005 cc/m$^2$/day when the crosslinking time is larger than 2 hrs.

Figure 5:
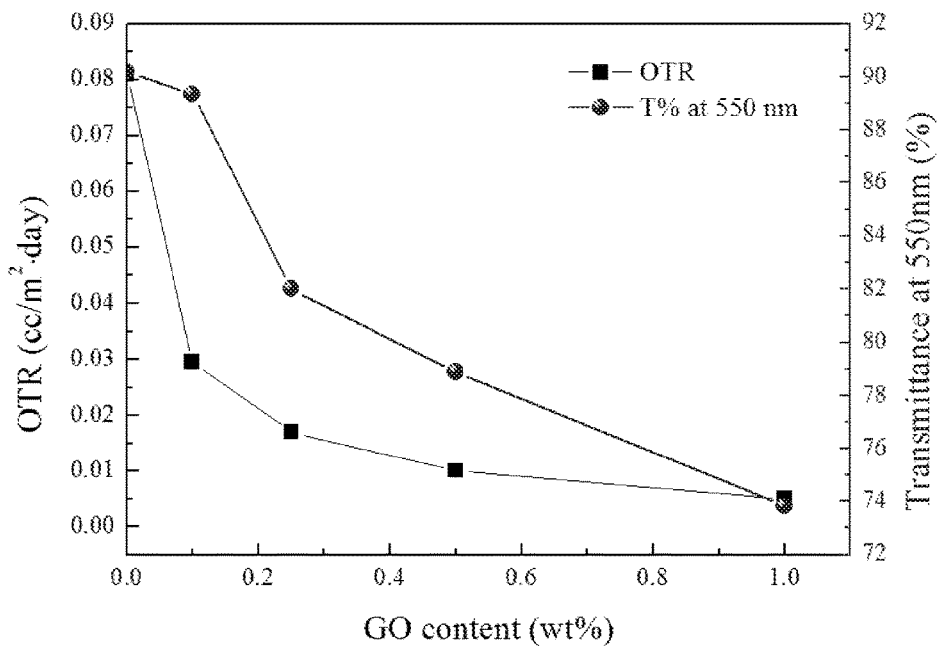
FIG. 5 shows a schematic diagram of the GO content vs. OTR and transmittance at 550 nm for the composite film according to one embodiment of the present invention.

FIG. 5 shows a schematic diagram of the GO content vs. OTR and transmittance at 550 nm for the composite film according to one embodiment of the present invention. As shown in FIG. 5, as the GO content increases, OTR decreases. Especially, at a very low content of GO, the decreasing trend becomes more obvious. For example, when the content is 0.1 wt %, OTR is dropped from 0.08 to 0.03 cc/m$^2$/day, i.e. about a decreasing rate of 62.5%. When the content increases, OTR continues to decrease. When the content increases from 0.1 wt % to 1.0 wt %, a decreasing rate becomes 93.7% increasing from 62.5% and OTR decreases to 0.005 cc/m$^2$/day. It indicates that GO can effectively enhance the barrier property of the PVA film.

Besides, for transmittance, when the GO content is 0.1 wt %, the light transmittance at 550 nm is not affected and only slight decreases from 91% to 89%. When the GO content increases (>0.1 wt %), the light transmittance quickly decreases. Especially, when the GO content increases from 0.1 wt % to 0.25 wt %, a decreasing rate becomes significant and the light transmittance is only about 82% which is not suitable to the requirements of a flexible display (>85%). When the GO content is 1 wt %, the light transmittance is only about 75%.

Figure 6:
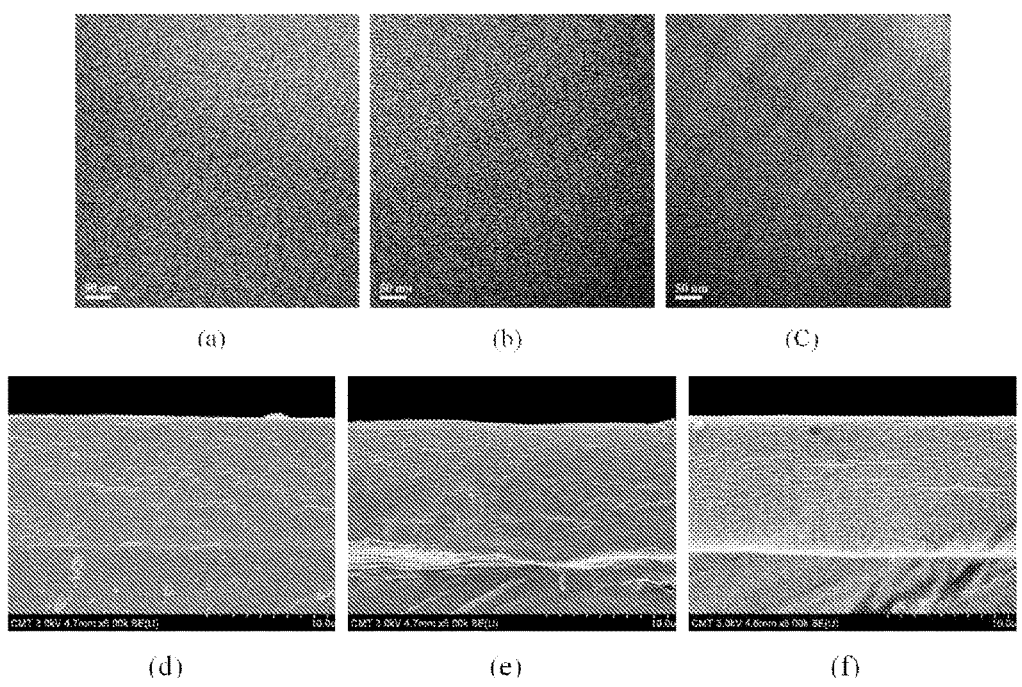
FIGS. 6 (a)~(c) show TEM images of the composite film according to one embodiment of the present invention where (a) GO=0.1 wt %; (b) GO=0.5 wt %; and (c) GO=1.0 wt %.

According to the above results, when the GO content is 0.1 wt %, GO can be well dispersed in the PVA matrix to form an exfoliated structure so that the barrier property can be enhanced and the high transmittance can be maintained. When the GO content is 0.25 wt %, GO starts to aggregate to form a tactoid or intercalated structure. Thus, a decreasing rate of OTR becomes smaller but the transmittance quickly decreases. Such a situation becomes more severe when the addition amount of GO increases. FIGS. 6 (a)~(c) show TEM images of the composite film according to one embodiment of the present invention where (a) GO=0.1 wt %; (b) GO=0.5 wt %; and (c) GO=1.0 wt %. FIGS. 6 (d)~(f) show FE-SEM cross-sectional images of the composite film according to one embodiment of the present invention where (d) GO=0.1 wt %; (e) GO=0.5 wt %; and (f) GO=1.0 wt %. When the GO content is 0.1 wt %, no aggregation of GO is observed. When the GO content is 0.5 wt %, aggregation of a thickness of 10~20 nm of GO nano flakes is found. At 1 wt %, not only the amount of aggregation increases but also self-alignment of GO is found. Although the self-alignment of GO can enhance the barrier property but decreases the transmittance which cannot meet the requirements of a flexible electronic product.

Figure 7:
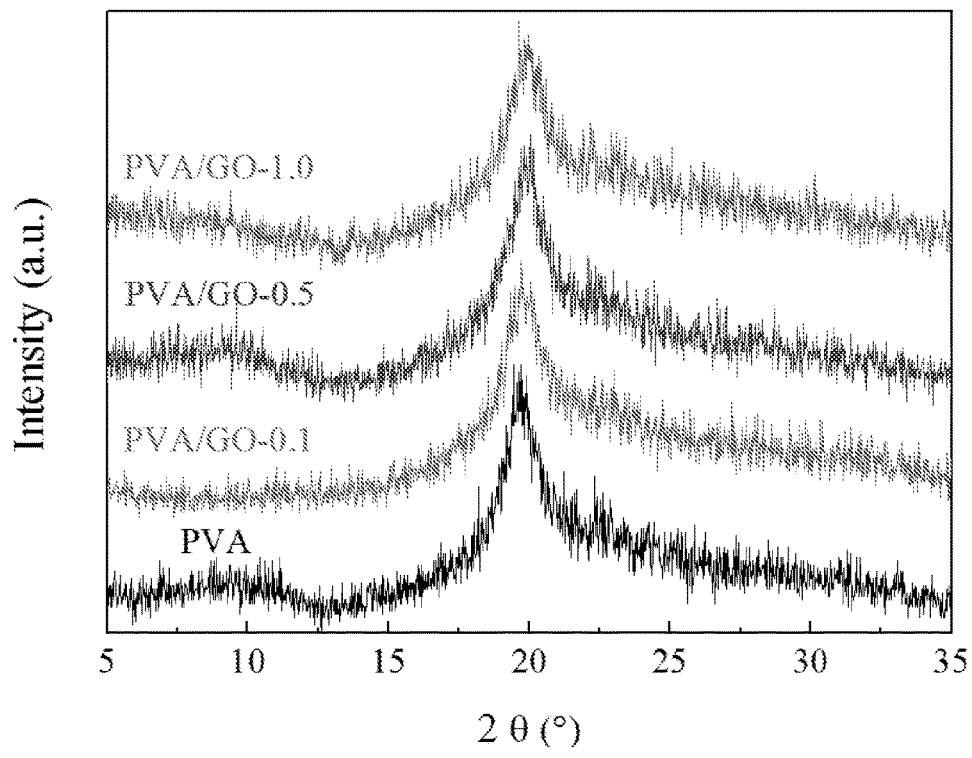
FIG. 7 shows a schematic diagram illustrating XRD of the composite film according to one embodiment of the present invention for PVA crystals and GO detected by an X-ray diffractometer.

The crystallization form and the microstructure of the PVA/GO composite film is discussed hereinafter. A differential scanning calorimeter (DSC) is used to analyze the dependence of the crystallinity of the PVA film on the GO addition. From table 1, it is found that the crystallinity of the PVA film is not affected when the GO content is from 0.1 wt % to 1.0 wt % where the difference is only about 0.7% within a reasonable error range. It indicates that the enhancement of the barrier property of the PVA film is mainly from GO but not its structure change. Furthermore, the wide angle X-ray diffraction (WAXD) is used to detect PVA crystals and the dispersion condition of GO. FIG. 7 shows a schematic diagram illustrating XRD of the composite film according to one embodiment of the present invention for PVA crystals and GO detected by an X-ray diffractometer. As shown in FIG. 7, at a diffraction angle of 19.9°, a strong peak is shown corresponding to PVA (101) which is not affected by the GO addition amount. Since WAXD is used to analyze a scale from sub-nano to nano size, in order to do a larger scale analysis, small-angle X-ray scattering is also performed. As shown in FIG. 7, in the range of 0.25~3.5°, no scattering peak is shown for the PVA/GO composite film. It indicates no significant aggregation of GO is shown.

TABLE 1

| GO content | | |
|---|---|---|
| w/w % | v/v % | crystallinity |
| 0 | 0 | 32.4 |
| 0.1 | 0.07 | 32.5 |
| 0.25 | 0.18 | 32.0 |
| 0.5 | 0.35 | 31.9 |
| 1.0 | 0.71 | 31.8 |

As shown in FIG. 5, in order to have high gas barrier and high transmittance of the composite film, 0.1 wt % is preferred. However, the PVA/GO-0.1 wt % composite film may satisfy the requirements of LCD and PV modules about $10^{-1}$~$10^{-2}$ cc/m$^2$/day but not the requirements of OLED and organic solar cells about $10^{-4}$~$10^{-6}$ cc/m$^2$/day. Thus, the isothermal recrystallization process for the PVA/GO-0.1 wt % composite film is performed to further enhance the barrier property.

Figure 8:
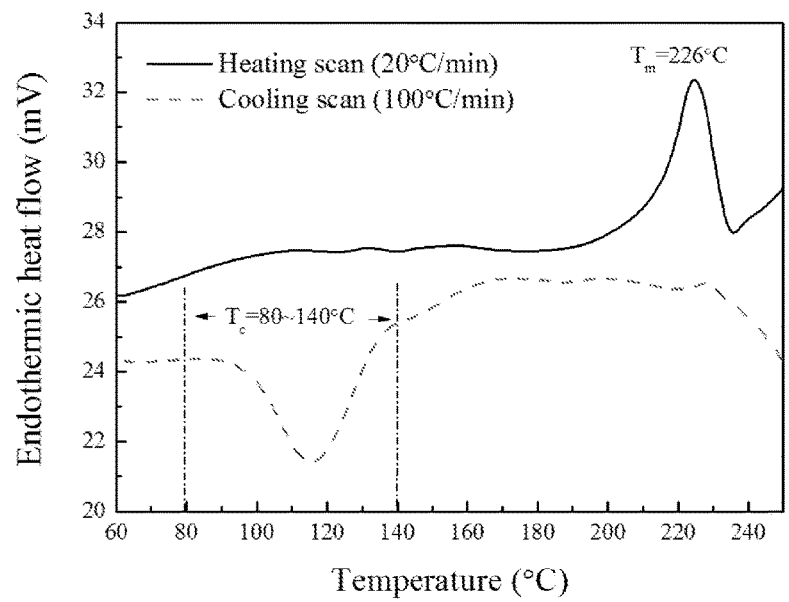
FIG. 8 shows a schematic diagram illustrating DSC thermograms of the composite film according to one embodiment of the present invention.
Figure 9:
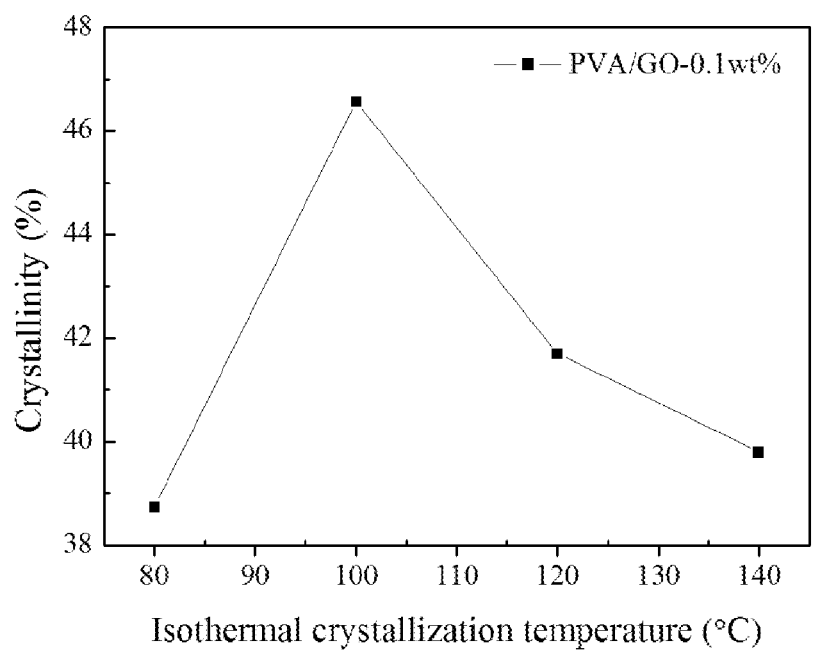
FIG. 9 shows a schematic diagram illustrating crystallinity vs. isothermal crystallized temperature according to one embodiment of the present invention.
Figure 10:
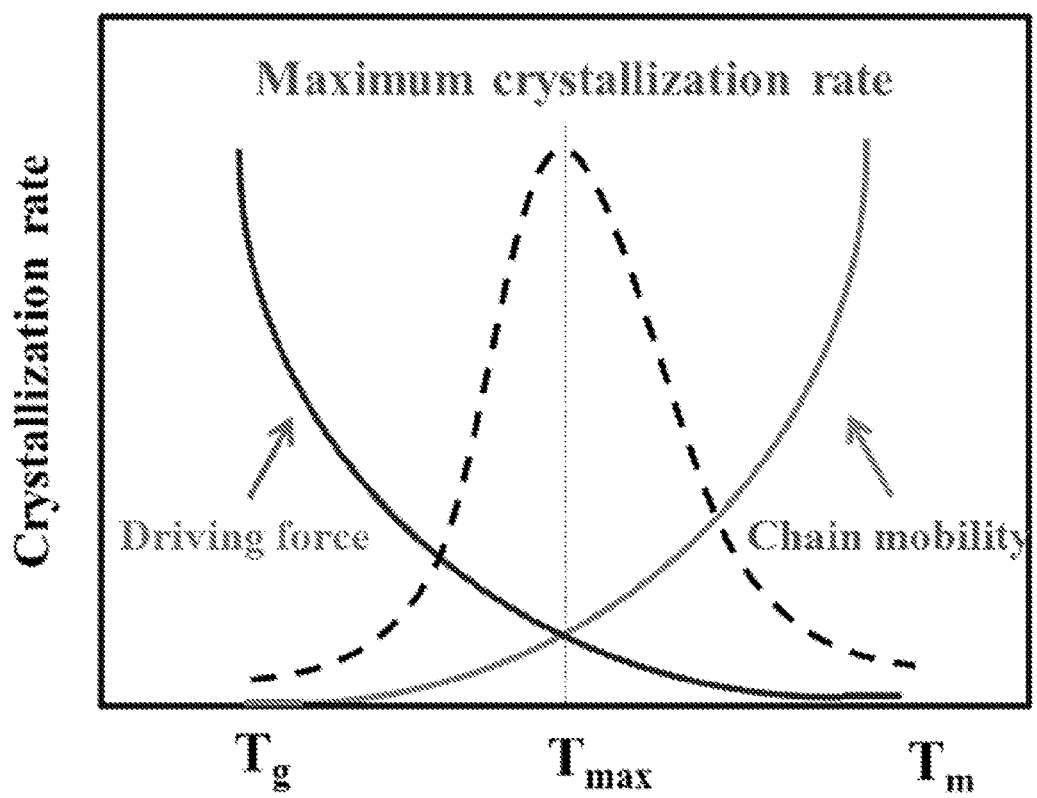
FIG. 10 shows a schematic diagram illustrating crystallized rate vs. crystallized temperature according to one embodiment of the present invention.

DSC is used to determine the temperature for the isothermal recrystallization process. FIG. 8 shows a schematic diagram illustrating DSC thermograms of the composite film according to one embodiment of the present invention. The melting point of PVA is 226° C. and the crystallization temperature of PVA is 80~140° C. The temperature for the isothermal recrystallization process is set to 80~140° C. to perform the isothermal recrystallization process on the PVA/GO-0.1 wt % composite film. The result is shown in FIG. 9. FIG. 9 shows a schematic diagram illustrating crystallinity vs. isothermal crystallized temperature according to one embodiment of the present invention. When the crystallization temperature is 100° C., the highest crystallinity is obtained. FIG. 10 shows a schematic diagram illustrating crystallized rate vs. crystallized temperature according to one embodiment of the present invention. When the semi-crystallized polymer at $T_g$~$T_m$, the polymer can be recrystallized. As the temperature is higher, the growth rate of crystals is faster and the nucleation rate is slower. That is, the low temperature assists in crystal growing but not nucleation. The high temperature is contrary. Thus, a temperature to have the highest crystal growth rate can be obtained. Besides, PVA/GO turns brown color when processed at a temperature more than 120° C. Therefore, the crystallization temperature is preferably 100° C.

Figure 11:
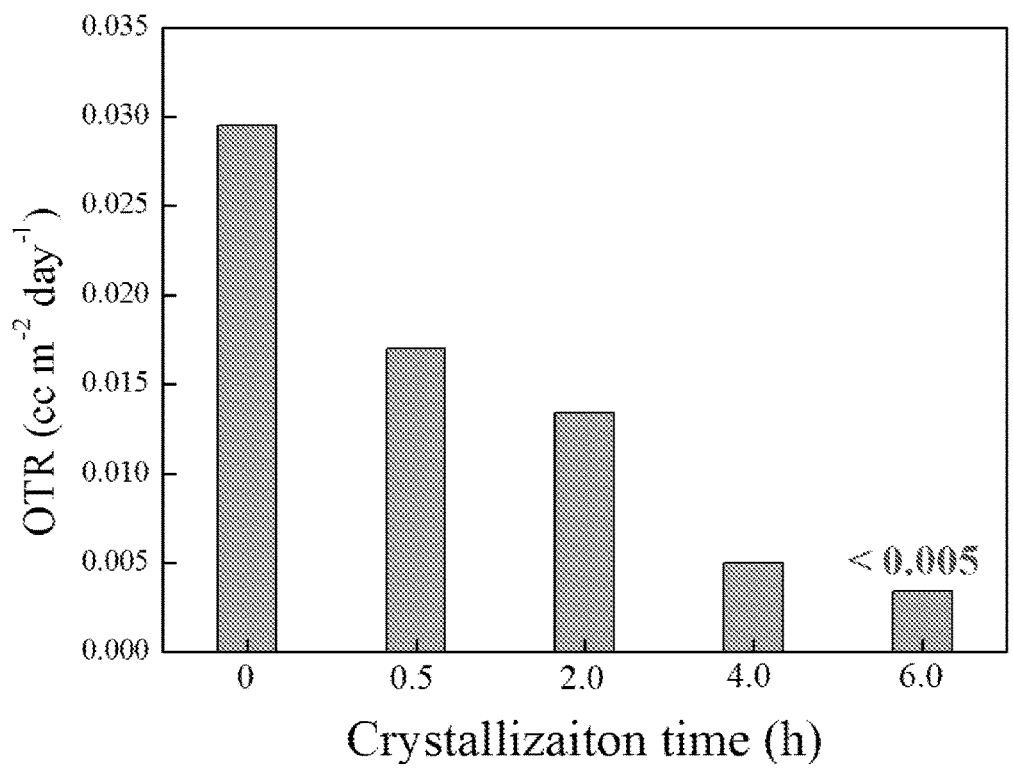
FIG. 11 shows a schematic diagram illustrating OTR vs. crystallization time of the composite film according to one embodiment of the present invention where the isothermal crystallized temperature is 100° C.
Figure 12:
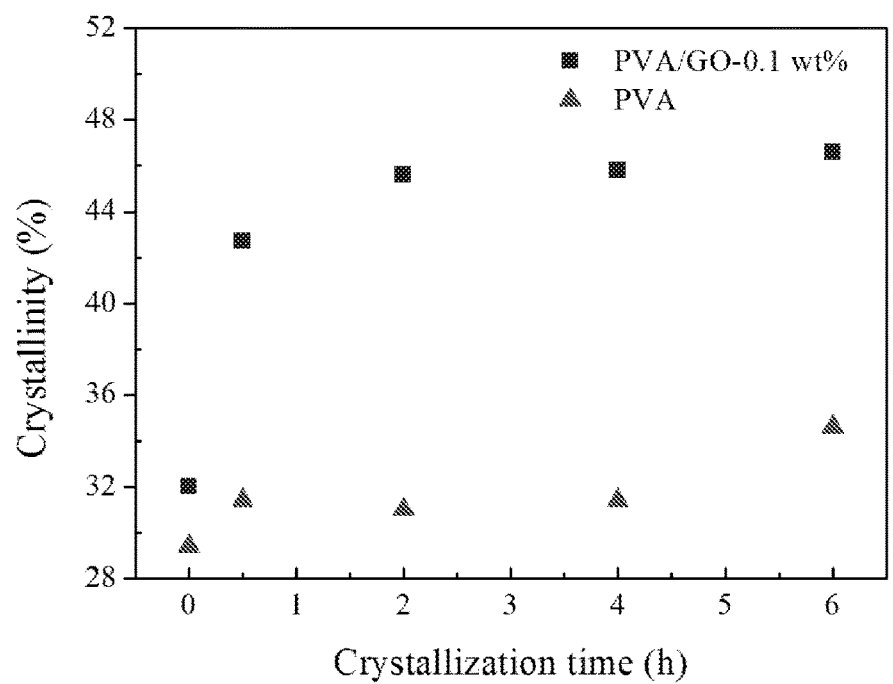
FIG. 12 shows a schematic diagram illustrating crystallinity vs. isothermal crystallized temperature of the composite film according to one embodiment of the present invention where the triangles represent PVA and the rectangles represent PVA/GO-0.1 wt %.
Figure 13:
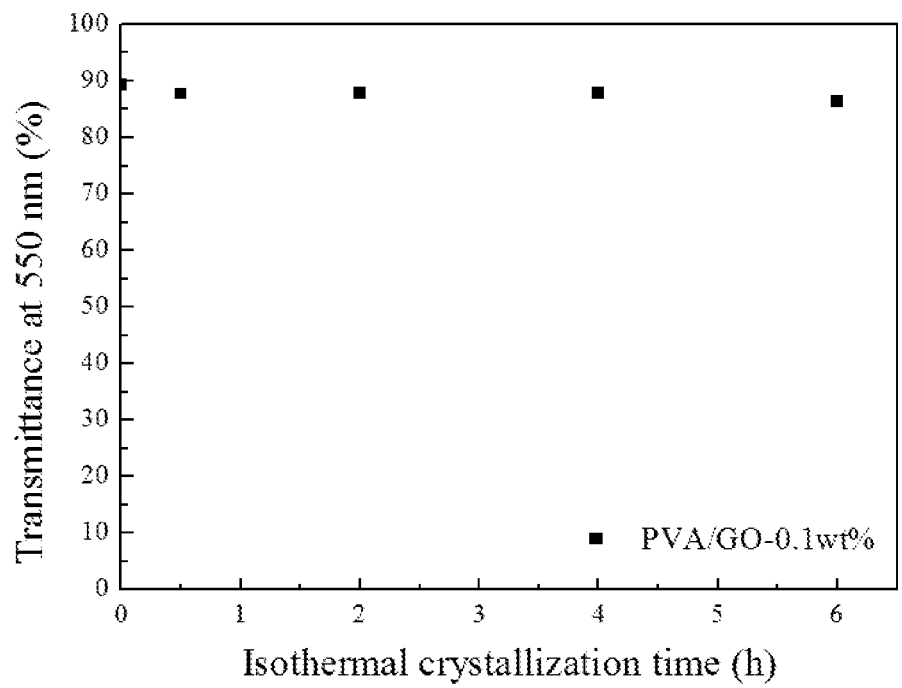
FIGS. 13 (a)~(c) show a schematic diagram illustrating transmittance at 550 nm vs. isothermal crystallized temperature of the composite film according to one embodiment of the present invention.
Figure 13:
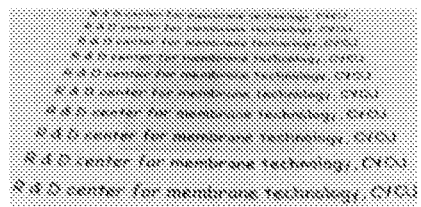
Figure 13:
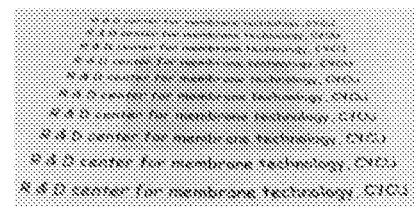

FIG. 11 shows a schematic diagram illustrating OTR vs. crystallization time of the composite film according to one embodiment of the present invention where the isothermal crystallized temperature is 100° C. As the temperature for the isothermal recrystallization process increases, OTR decreases significantly. When the processing time reaches 6 hrs, OTR reaches the lowest limit of the instrument (<0.005 cc/m$^2$/day for an area of 50 cm$^2$). Therefore, the isothermal recrystallization process can effectively enhance the barrier property. It may be because the newly grown PVA crystals exist between the nano flakes of GO to fill up gaps or empty space to form a dense structure to prolong the gas permeation path. In order to prove the PVA crystals grow surround GO, DSC is used to identify for PVA and PVA/GO-0.1 wt %. FIG. 12 shows a schematic diagram illustrating crystallinity vs. isothermal crystallized temperature of the composite film according to one embodiment of the present invention where the triangles represent PVA and the rectangles represent PVA/GO-0.1 wt %. The crystallinity for both films increases as the processing time increases. The crystallinity of the PVA/GO-0.1 wt % film is faster. At any specific timing, the crystallinity of the PVA/GO-0.1 wt % film is higher. For example, at 4 hr, the difference between two is 14.4%. It indicates that GO is a nucleation agent in the PVA matrix and induces new crystals around PVA during the isothermal recrystallization process. FIGS. 13 (a)~(c) shows a schematic diagram illustrating transmittance at 550 nm vs. isothermal crystallized temperature of the composite film according to one embodiment of the present invention. After 0~6 hrs of the isothermal recrystallization process, the transmittance of the PVA/GO film at 550 nm has no change and is maintained at >85%.

Figure 14:
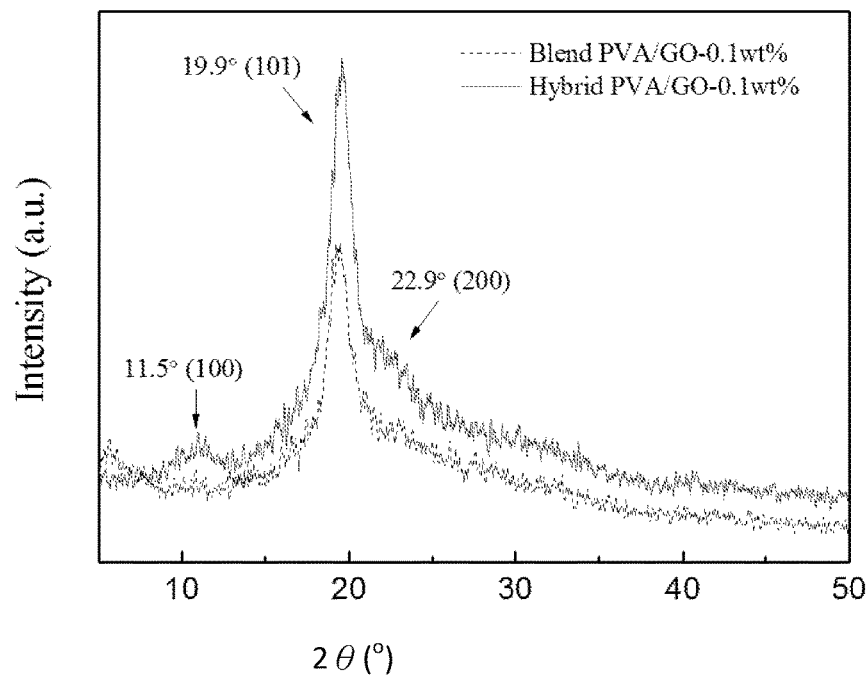
FIG. 14 shows a schematic diagram illustrating WAXD testing patterns of the composite film according to one embodiment of the present invention after crystallization where PVA/GO has 0.1 wt % of GO.
Figure 15:
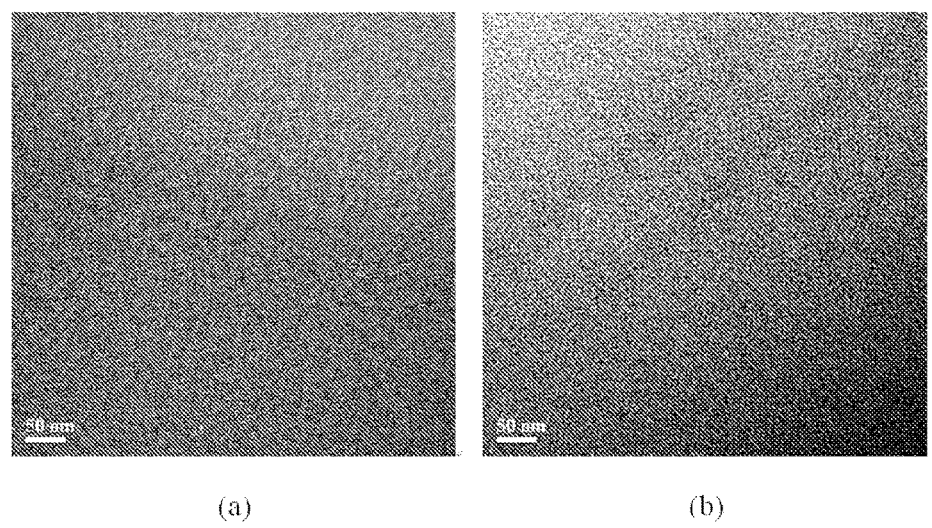
FIGS. 15 (a)~(b) shows a schematic diagram illustrating TEM testing patterns of the composite film according to one embodiment of the present invention after crystallization where PVA/GO has 0.1 wt % of GO.

Furthermore, the wide angle X-ray diffraction (WAXD) is used to detect PVA crystals after the isothermal recrystallization process for the PVA/GO-0.1 wt % film. FIG. 14 shows a schematic diagram illustrating WAXD testing patterns of the composite film according to one embodiment of the present invention after crystallization where PVA/GO has 0.1 wt % of GO. As shown in FIG. 14, the unprocessed film has one peak (101) and a peak at 11.5° and a shoulder at 22.9° are shown after the process of 100° C. and 6 hrs besides the peak (101) is enhanced. It indicates that GO assists in the growth of (101) crystals and induces new crystals. FIGS. 15 (a)~(b) shows TEM images for PVA/GO-0.1 wt % films before (a) and after (b) crystallization. FIGS. 15 (a)~(b) shows a schematic diagram illustrating TEM images of the composite film according to one embodiment of the present invention after crystallization where PVA/GO has 0.1 wt % of GO. As shown in FIG. 15, no GO is hard to be observed for the PVA/GO-0.1 wt % film. After the isothermal recrystallization process, GO can be seen because new crystals link GO together to form a dense structure to be observed in the TEM image.

Figure 16:
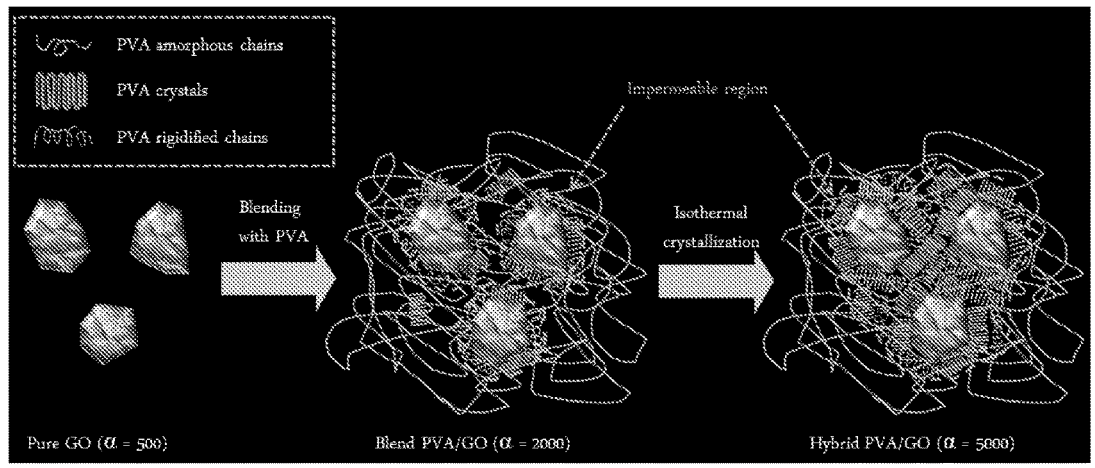
FIG. 16 shows a schematic diagram illustrating PVA/GO hybrid structures of the composite film according to one embodiment of the present invention.

After the isothermal recrystallization process, new PVA crystals induced by GO and the stiff PVA segments fills the gaps between GO nano flakes to link GO together to form a special PVA crystal/GO hybrid structure. FIG. 16 shows a schematic diagram illustrating PVA/GO hybrid structures of the composite film according to one embodiment of the present invention.

Figure 17:
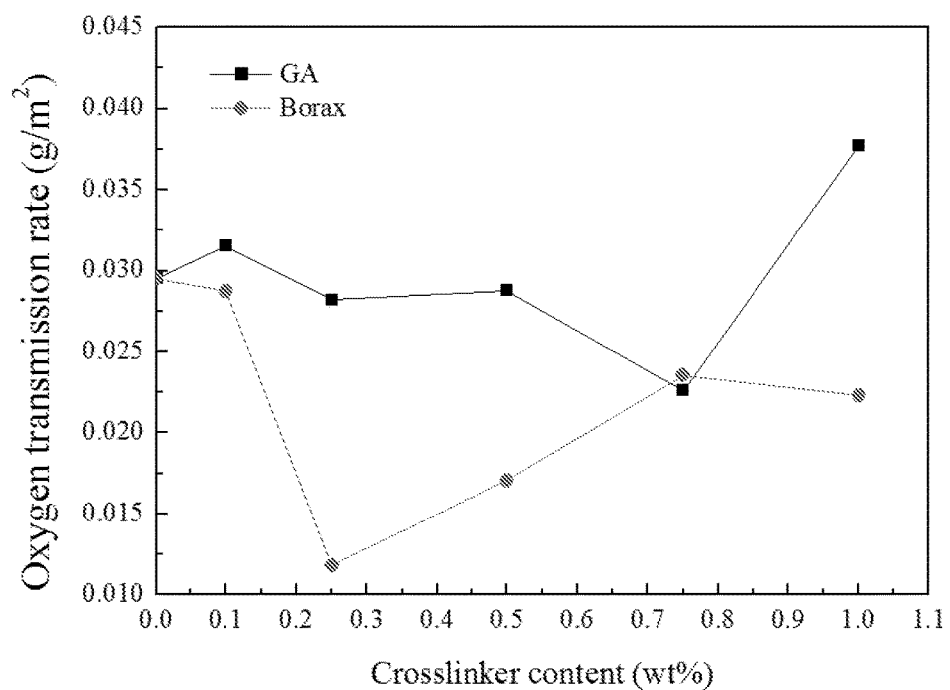
FIG. 17 shows a schematic diagram illustrating OTR vs. crosslinking content of the composite film according to one embodiment of the present invention where the crosslinking time is 1 hour.

The dependence of the barrier property on the crosslinking agent and concentration is shown in FIG. 17. FIG. 17 shows a schematic diagram illustrating OTR vs. crosslinking content of the composite film according to one embodiment of the present invention where the crosslinking time is 1 hour. OTR decreases at first and then increases as the concentration of the crosslinking agent increases for GA or Borax. For GA and Borax, the minimum values are obtained at 0.75 wt % and 0.25 wt %, respectively. It may be affected by crosslinking and crystallinity. As the concentration of the crosslinking agent increases, the degree of crosslinking increases but affects PVA piling-up when the excess crosslinking agent causes the incomplete reaction or branching so that the crystallinity is changed.

Figure 18:
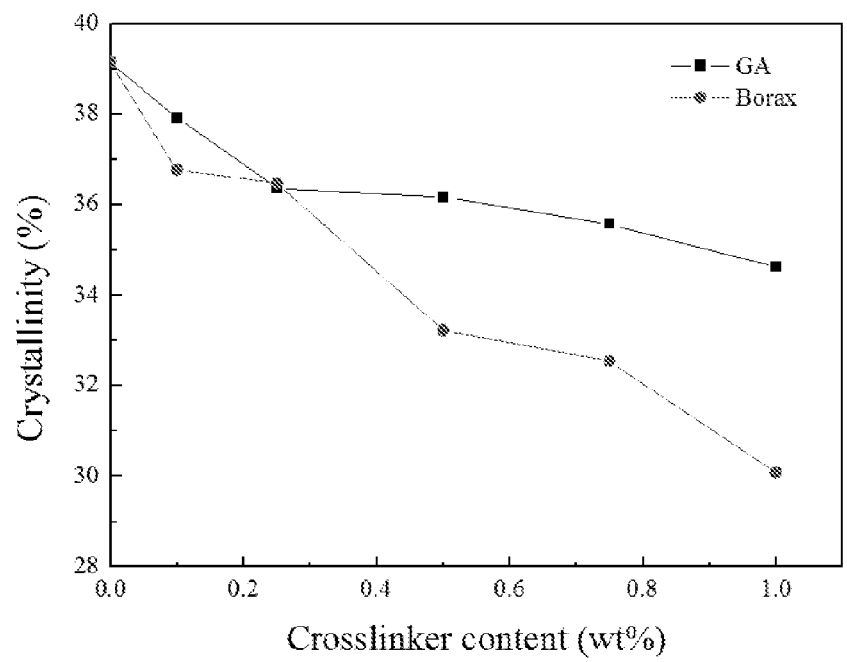
FIG. 18 shows a schematic diagram illustrating crystallinity vs. crosslinking content of the composite film according to one embodiment of the present invention where the crosslinking time is 1 hour.
Figure 19:
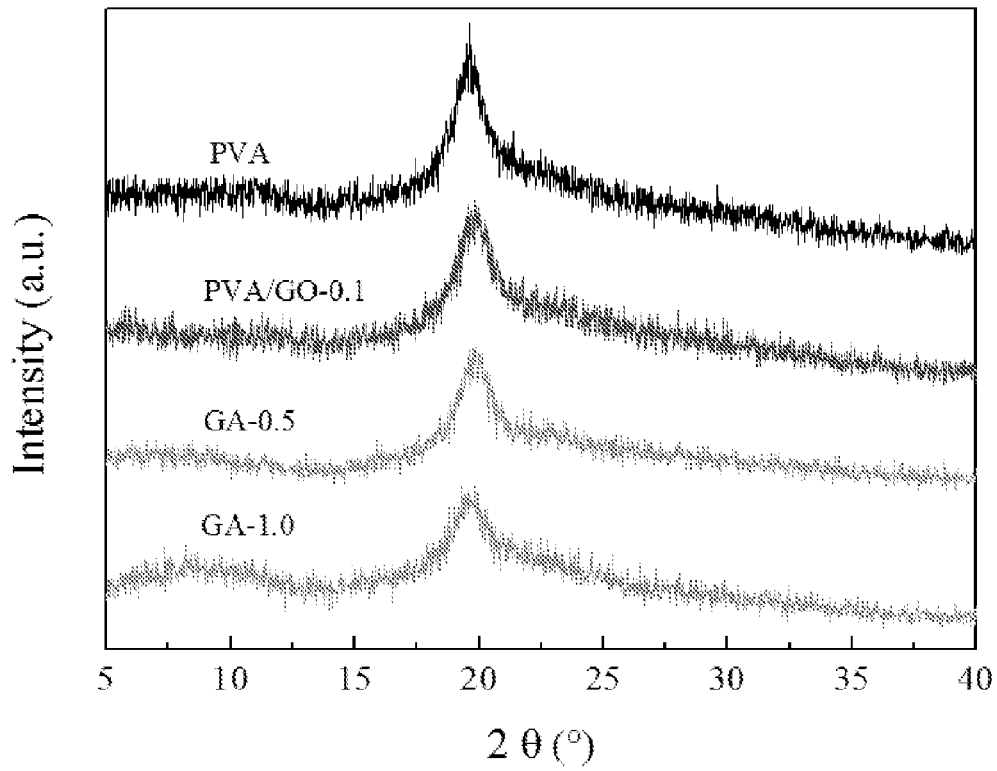
FIG. 19 shows a schematic diagram illustrating XRD of the composite film according to one embodiment of the present invention for PVA, PVA/GO-0.1 and GA-crosslinking film detected by an X-ray diffractometer.
Figure 20:
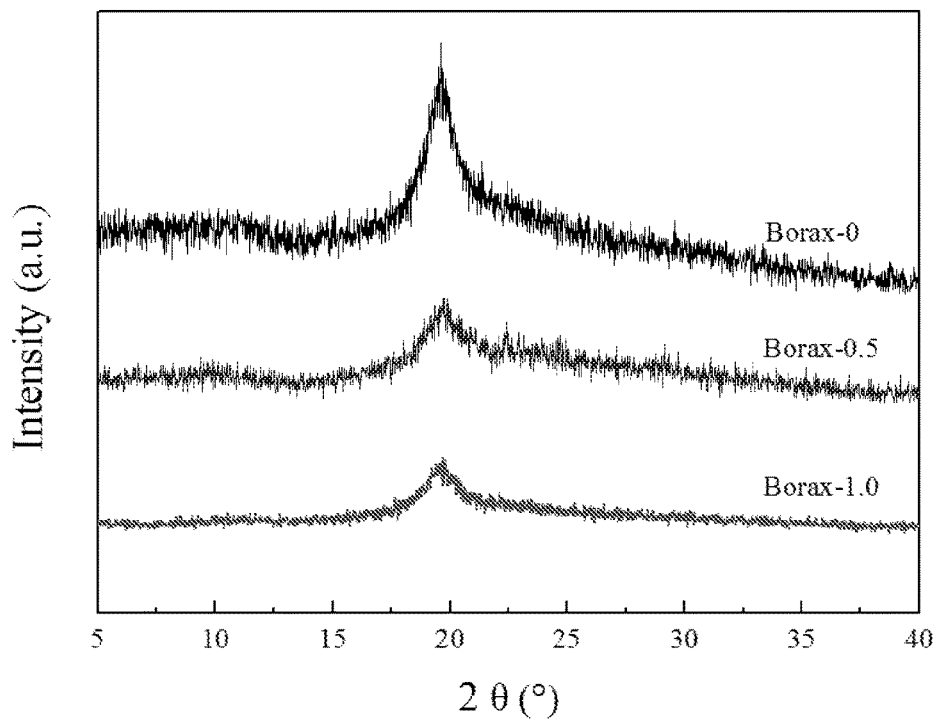
FIG. 20 shows a schematic diagram illustrating XRD of the composite film according to one embodiment of the present invention for PVA, PVA/GO-0.1 and Borax-crosslinking film detected by an X-ray diffractometer.

Furthermore, FIG. 18 shows a schematic diagram illustrating crystallinity vs. crosslinking content of the composite film according to one embodiment of the present invention where the crosslinking time is 1 hour. The DSC result shows the crystallinity of PVA is lower because crosslinking or branching weakens hydrogen bonding between PVA and interferes PVA piling-up, as the concentration of the crosslinking agent is higher. FIG. 19 shows a schematic diagram illustrating XRD of the composite film according to one embodiment of the present invention for PVA, PVA/GO-0.1 and GA-crosslinking film detected by an X-ray diffractometer. FIG. 20 shows a schematic diagram illustrating XRD of the composite film according to one embodiment of the present invention for PVA, PVA/GO-0.1 and Borax-crosslinking film detected by an X-ray diffractometer. At a diffraction angle of 19.9°, a strong peak is shown corresponding to PVA (101) which is weaker when the concentration of GA or Borax increases. It indicates that the amount of crystals in PVA clearly decreases. Since crosslinking can make the structure tighter to enhance the barrier property and branching or crystallinity decreases the barrier property, the two factors can result in one smallest OTR.

FIG. 17 also shows Borax can be more effectively reduce OTR than GA. As the addition of Borax is 0.25 wt %, 60% of OTR can be decreased. As the addition of GA is 0.75 wt %, 27% of OTR can be decreased. The difference is because Borax has four OH groups to react with PVA/GP while GA has two CHO groups. At the same condition, the reaction rate of Borax is faster to have a higher degree of crosslinking. Besides, the center of crosslinking of Borax is a boron atom and has a smaller steric effect than GA so as to form a tighter crosslinking structure. Even if there is branching, the effect on polymer chains or GO is small.

Figure 21:
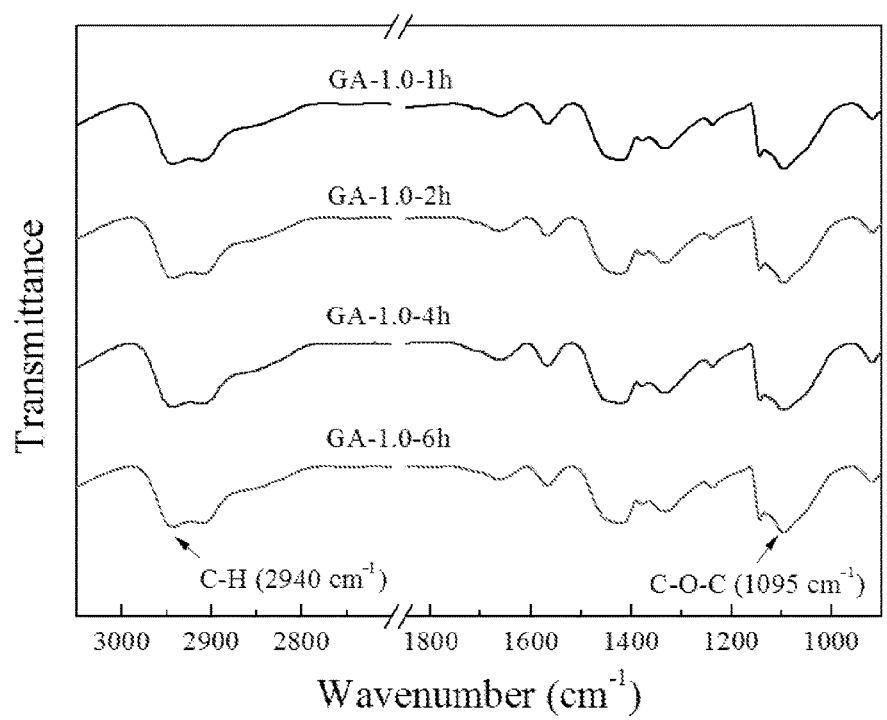
FIG. 21 shows a schematic diagram illustrating FTIR spectra of the composite film according to one embodiment of the present invention for PVA/GO-0.1 crosslinking with GA for different crosslinking time.
Figure 22:
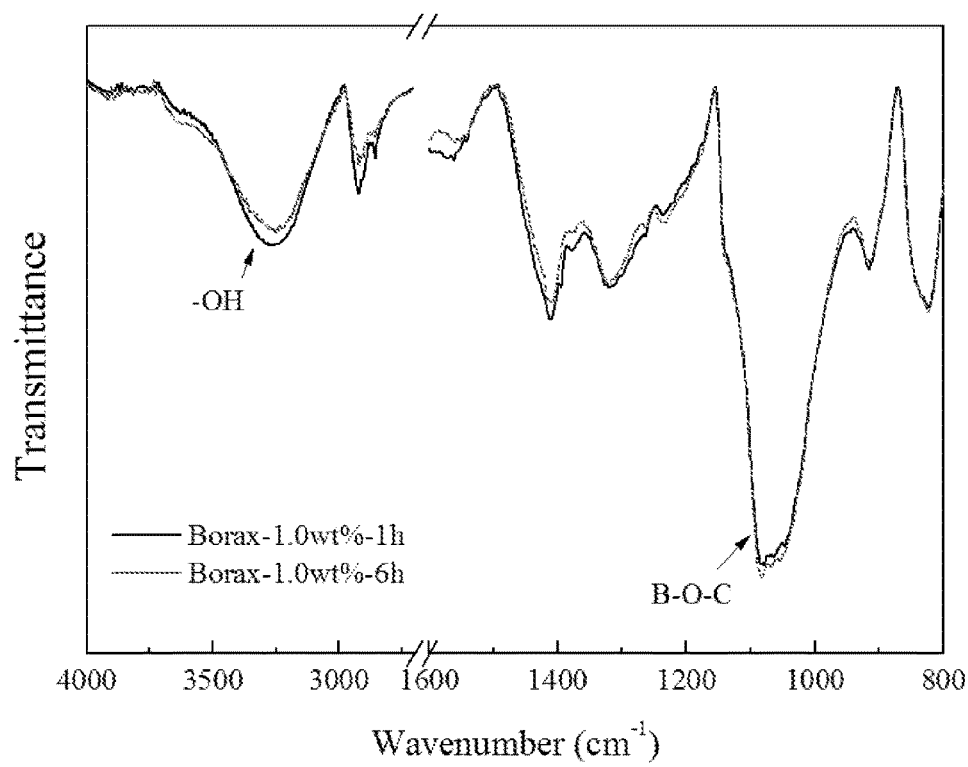
FIG. 22 shows a schematic diagram illustrating FTIR spectra of the composite film according to one embodiment of the present invention for PVA/GO-0.1 crosslinking with Borax for different crosslinking time.
Figure 23:
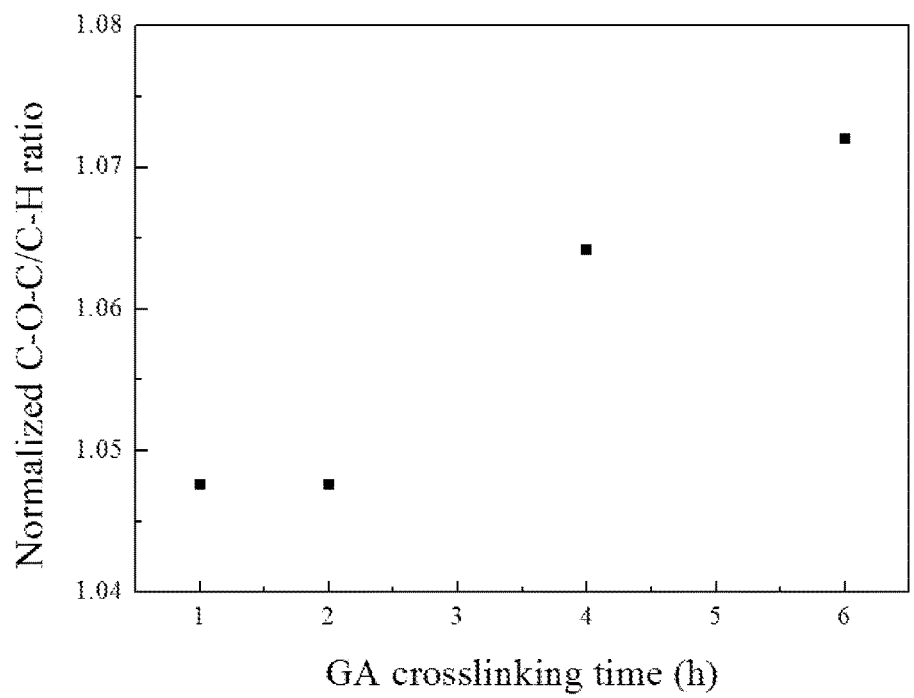
FIG. 23 shows a schematic diagram illustrating C—O—C/C—H bonding rate vs. GA crosslinking time of the composite film according to one embodiment of the present invention where the crosslinking content of PVA/GO-0.1 is 1.0 wt %.
Figure 24:
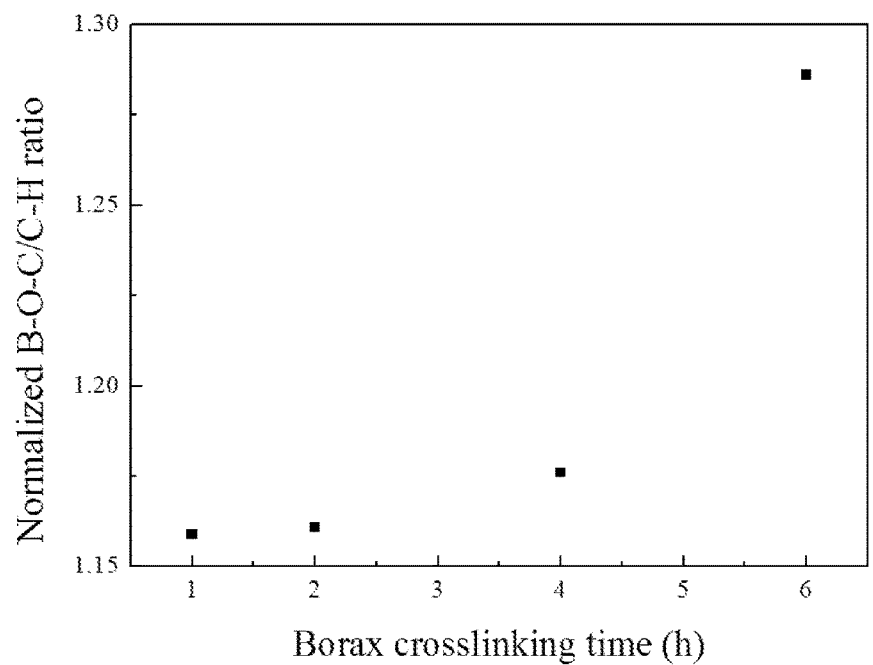
FIG. 24 shows a schematic diagram illustrating B—O—C/C—H bonding rate vs. Borax crosslinking time of the composite film according to one embodiment of the present invention where the crosslinking content of PVA/GO-0.1 is 1.0 wt %.

The degree of crosslinking of the PVA/GO film is determined by FTIR. FIG. 21 shows a schematic diagram illustrating FTIR spectra of the composite film according to one embodiment of the present invention for PVA/GO-0.1 crosslinking with GA for different crosslinking time. FIG. 22 shows a schematic diagram illustrating FTIR spectra of the composite film according to one embodiment of the present invention for PVA/GO-0.1 crosslinking with Borax for different crosslinking time. As the crosslinking time increases, the peak of C—O—C increases for GA and the peak of B—O—C increases for borax. FIG. 23 shows a schematic diagram illustrating C—O—C/C—H bonding rate vs. GA crosslinking time of the composite film according to one embodiment of the present invention where the crosslinking content of PVA/GO-0.1 is 1.0 wt %. FIG. 24 shows a schematic diagram illustrating B—O—C/C—H bonding rate vs. Borax crosslinking time of the composite film according to one embodiment of the present invention where the crosslinking content of PVA/GO-0.1 is 1.0 wt %. The ratio of C—O—C/$CH_2$ and the ratio of B—O—C/$CH_2$ also increase, as the crosslinking time increases. As the crosslinking time increases, it makes the branching structure or the unreacted crosslink agent crosslink so as to increase the degree of crosslinking. As crosslinking time increases, from FIG. 4, OTR decreases for Borax and GA. When the time increases from 1 hr to 6 hrs, OTR decreases from 0.037 to 0.009 cc/$m^2$/day, i.e. about 75% decrease. For the Borax crosslinking film, when the crosslinking time is more than 2 hrs, OTR is below the lowest limit of MOCON (<0.005 cc/$m^2$/day), i.e. >75% decrease. From the result, the increase of the crosslinking time enhances the barrier property. When Borax is used as the crosslinking agent, the crosslinking time only needs to be 2 hrs to effectively lower OTR of the PVA/GO film to achieve the requirement of ultra-high gas barrier.

Figure 25:
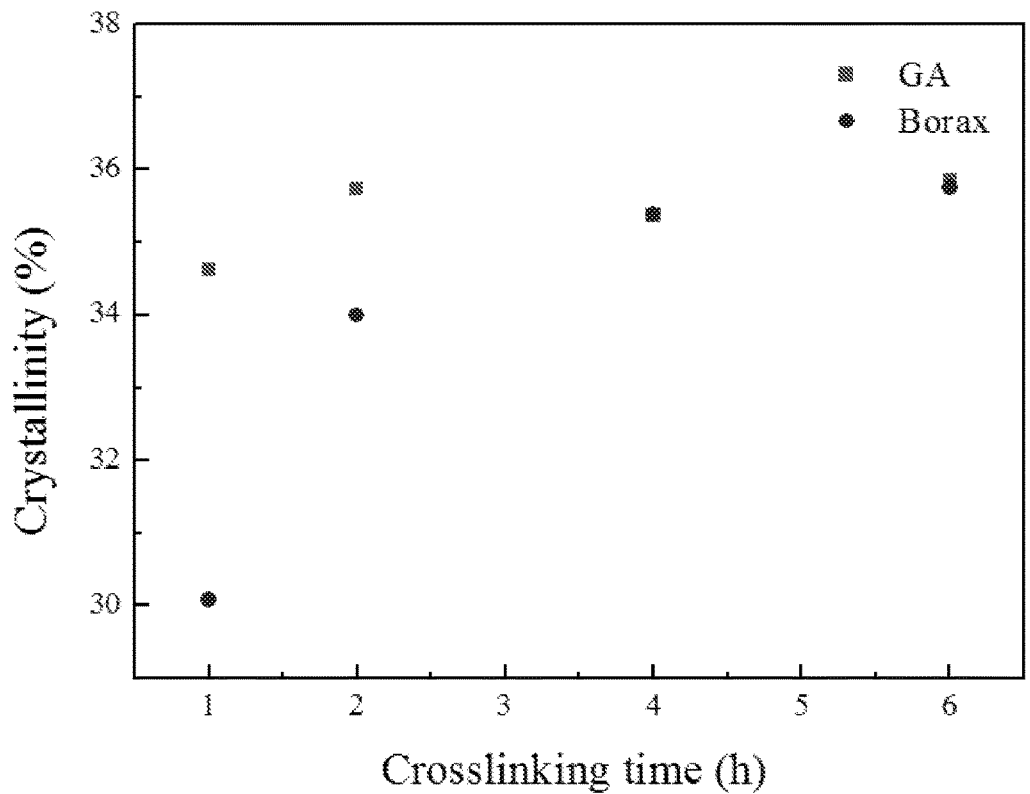
FIG. 25 shows a schematic diagram illustrating crystallinity vs. crosslinking time of the composite film according to one embodiment of the present invention where the crosslinking content is 1 wt %.

FIG. 25 shows a schematic diagram illustrating crystallinity vs. crosslinking time of the composite film according to one embodiment of the present invention where the crosslinking content is 1 wt %. For GA, the crystallinity will not increase as the crosslinking time increases. For Borax, the crystallinity increases as the crosslinking time increases. It may be because (1) the interaction force between PVA and GO enhances where Borax has a stiffer structure than GA to limit PVA disturbance to form uniform molecular chains closely attaching to GO crystalline surfaces to form regular arrangement and stacks to generate PVA crystals; and (2) GO are closely linked to form regular arrangement after crosslinking by Borax where the forming of PVA crystals are induced. For GA, the crosslinking time increases, the degree of crosslinking increases but the branching decreases and the crystallinity is unchanged. Thus, OTR decreases. When GA-1.0 wt % is used to crosslink for 6 hrs, OTR is 0.009 cc/$m^2$/day. For Borax, the degree of crosslinking and the crystallinity both increase but the branching decreases. Thus, OTR decreases. When Borax-1.0 wt % is used to crosslink for more than 2 hrs, OTR is <0.005 cc/$m^2$/day.

Figure 26:
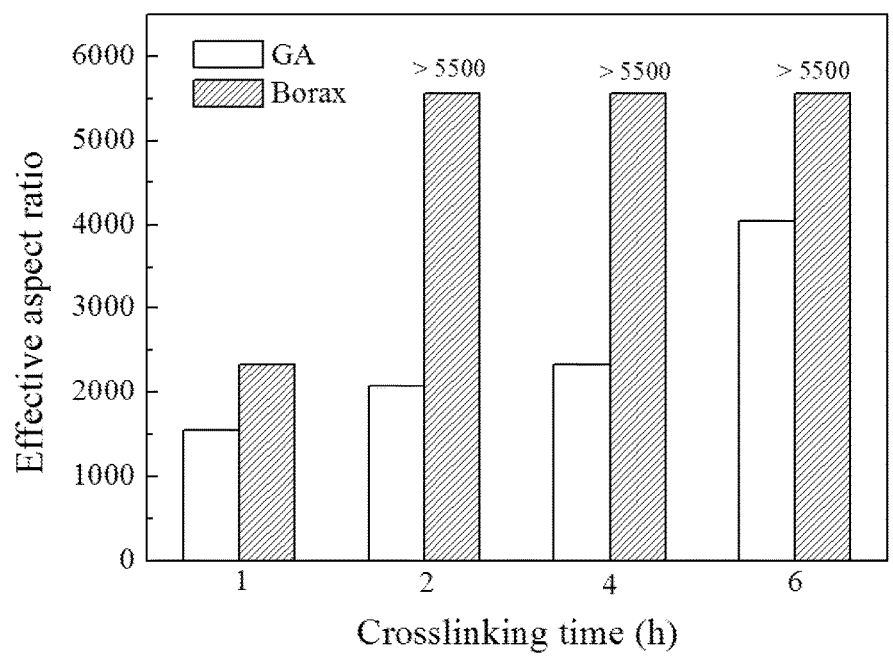
FIG. 26 shows a schematic diagram illustrating effective aspect ratio vs. crosslinking time of the composite film according to one embodiment of the present invention where the crosslinking content is 1 wt %.
Figure 27:
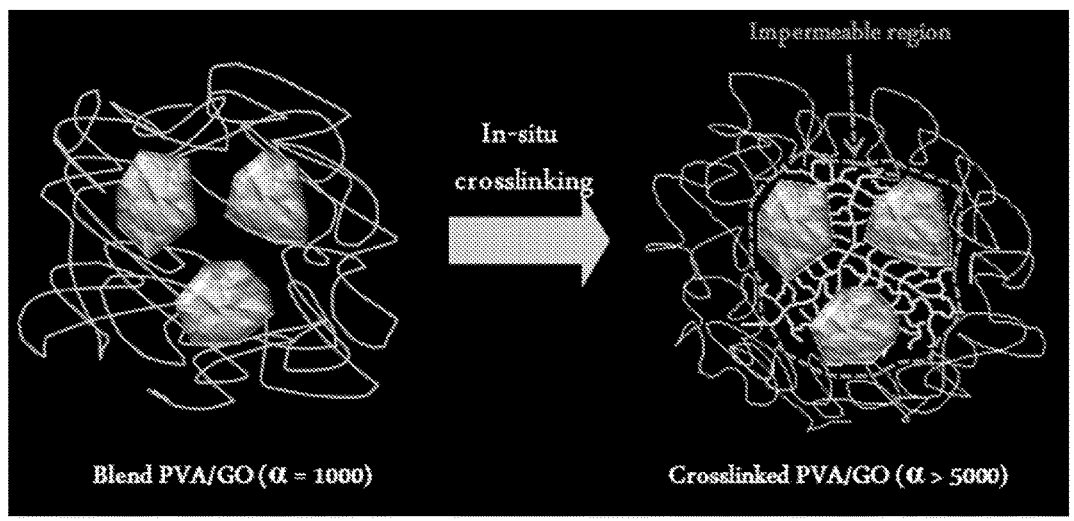
FIG. 27 shows a schematic diagram illustrating PVA/GO crosslinking structure of the composite film according to one embodiment of the present invention.

FIG. 26 shows a schematic diagram illustrating effective aspect ratio vs. crosslinking time of the composite film according to one embodiment of the present invention where the crosslinking content is 1 wt %. As the crosslinking time increases, the effective aspect ratio increases. Especially for Borax, when the crosslinking time is more than 2 hrs, the effective aspect ratio is larger than 5500 and is ten times the aspect ratio of GO. According to the data, the randomly dispersed GO in the film after in-situ crosslinking is linked together by the crosslinking network to form a large impermeable area. FIG. 27 shows a schematic diagram illustrating PVA/GO crosslinking structure of the composite film according to one embodiment of the present invention. DMA is used to measure Tg of PVA, PVA/GO and crosslinked PVA/GO films and the result shows in table 2. After crosslinking with 1 wt % GA or Borax for 6 hrs, Tg raises from 90.7° C. to 92° C. and 102° C. It indicates crosslinking limits disturbance of PVA chain segments and the free volume is reduced. Besides, at the same condition except having GO-0.1 wt %, Tg of the crosslinked PVA/GO film with GA and Borax further raises to 106 and 120° C. It indicates crosslinking not only occurs between PVA but also relates to GO so that the molecular chains of PVA become stiff. Thus, the proposed structure exists.

In conclusion, according to the transparent gas barrier composite film and the preparation method of the present invention, the composite film has high transmittance, an elongated path for gas permeation, a densified polymer structure, increased interaction between PVA and GO, linkages between GO nano flakes and polymers, and an increased aspect ratio. Therefore, a simple and low cost method is provided to obtain a high transparent and high gas barrier suitable for flexible electronic devices.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A method for preparing a transparent gas barrier composite film, comprising:
   providing a polyvinyl alcohol containing aqueous solution;
   providing a graphene oxide dispersed aqueous solution;
   performing a blending procedure, to blend the polyvinyl alcohol containing aqueous solution with the graphene oxide dispersed aqueous solution to obtain a casting solution wherein a weight ratio of graphene oxide in the graphene oxide dispersed aqueous solution to polyvinyl alcohol in the polyvinyl alcohol containing aqueous solution is less than 0.1 wt %;
   performing a cross-linking procedure for 1-6 hours, to add a cross-linking agent into the casting solution to have in-situ cross-linking reaction;
   performing a film-casting procedure, to coat the casting solution after the in-situ cross-linking reaction on a substrate to form a coating and dry the coating so as to obtain a composite film which has a crosslinking content being about 1.0 wt. %; and
   performing an isothermal crystallization procedure for 1-6 hours at a specific temperature to have crystals of polyvinyl alcohol grow and to have graphene oxide induce the crystals of polyvinyl alcohol to grow so as to incorporate with graphene oxide and the cross-linking agent to form a hybrid network structure of the crystals of polyvinyl alcohol, graphene oxide and the cross-linking agent.

2. The method according to claim 1, wherein, in the cross-linking procedure, the cross-linking agent is glutaraldehyde or sodium tetraborate.

3. The method according to claim 2, wherein the cross-linking agent is glutaraldehyde and the cross-linking agent in the casting solution (being 100 wt %) is 0.2-0.85 wt %.

4. The method according to claim 2, wherein the cross-linking agent is sodium tetraborate and the cross-linking agent in the casting solution (being 100 wt %) is 0.1-1.0wt %.

5. The method according to claim 1, wherein the specific temperature is within 80-120° C.

6. The method according to claim 5, wherein the specific temperature is within 90-100° C.

7. The method according to claim 1, wherein, in the blending procedure, a weight ratio of graphene oxide to polyvinyl alcohol is 0.1 wt % and the obtained composite film has light transmittance larger than 85%.

8. The method according to claim 1, wherein the substrate is polyethylene terephthalate and the coating after dried has a thickness of 10 μm.

9. The method according to claim 1, wherein polyvinyl alcohol in the polyvinyl alcohol containing aqueous solution has concentration of 5-10 wt %.

10. A transparent gas barrier composite film, being formed by having polyvinyl alcohol, graphene oxide and a cross-linking agent undergo blending, crosslinking, film casting and isothermal crystallization procedures wherein a weight ratio of graphene oxide to polyvinyl alcohol is 0.1 wt %, graphene oxide induces crystallization of polyvinyl alcohol to form a hybrid structure compose of polyvinyl alcohol crystals, graphene oxide and the crosslinking agent, crystallinity of polyvinyl alcohol is more than 30%, and transmittance of the composite film is more than 85% and wherein said crosslinking content of the transparent gas barrier composite film is 1.0 wt. %.

11. The transparent gas barrier composite film according to claim 10, wherein the cross-linking agent is sodium tetraborate; sodium tetraborate forms B—O—C bonds together with polyvinyl alcohol and graphene oxide; and a cross-linking rate defined as a ratio of numbers of B—O—C bonds to numbers of —$CH_2$ bonds is 1.05-1.15.

12. The transparent gas barrier composite film according to claim 10, wherein the composite film has an oxygen transmission rate less than 0.005 cc/m$^2$/day.

13. The transparent gas barrier composite film according to claim 10, wherein the cross-linking agent is glutaraldehyde; glutaraldehyde forms C—O—C bonds together with polyvinyl alcohol and graphene oxide; and a cross-linking rate defined as a ratio of numbers of C—O—C bonds to numbers of —$CH_2$ bonds is 1.02-1.05.

14. The transparent gas barrier composite film according to claim 10, wherein blending, crosslinking, film casting and isothermal crystallization procedures comprises the following steps:
   providing a polyvinyl alcohol containing aqueous solution;
   providing a graphene oxide dispersed aqueous solution;
   performing a blending procedure, to blend the polyvinyl alcohol containing aqueous solution with the graphene oxide dispersed aqueous solution to obtain a casting solution wherein a weight ratio of graphene oxide in the graphene oxide dispersed aqueous solution to polyvinyl alcohol in the polyvinyl alcohol containing aqueous solution is less than 0.1 wt %;

performing a cross-linking procedure, to add a cross-linking agent into the casting solution to have in-situ cross-linking reaction; and performing a film-casting procedure, to coat the casting solution after the in-situ cross-linking reaction on a substrate to form a coating and dry the coating so as to obtain a composite film.

\* \* \* \* \*